United States Patent
Cahn et al.

(10) Patent No.: US 7,813,454 B2
(45) Date of Patent: Oct. 12, 2010

(54) APPARATUS AND METHOD FOR TRACKING SYMBOL TIMING OF OFDM MODULATION IN A MULTI-PATH CHANNEL

(75) Inventors: Charles Robert Cahn, Manhattan Beach, CA (US); Sharath Ananth, Oceanside, CA (US)

(73) Assignee: Sirf Technology, Inc., San Jose, CA (US)

( * ) Notice: Subject to any disclaimer, the term of this patent is extended or adjusted under 35 U.S.C. 154(b) by 981 days.

(21) Appl. No.: 11/470,560

(22) Filed: Sep. 6, 2006

(65) Prior Publication Data

US 2007/0092013 A1  Apr. 26, 2007

Related U.S. Application Data

(60) Provisional application No. 60/714,927, filed on Sep. 7, 2005, provisional application No. 60/753,469, filed on Dec. 22, 2005.

(51) Int. Cl.
*H04L 27/06* (2006.01)
*H04K 1/10* (2006.01)
(52) U.S. Cl. .................................... 375/340; 375/260
(58) Field of Classification Search ................. 375/340, 375/260, 316, 259
See application file for complete search history.

(56) References Cited

U.S. PATENT DOCUMENTS

| | | | |
|---|---|---|---|
| 6,163,608 A * | 12/2000 | Romesburg et al. .... | 379/406.01 |
| 6,411,892 B1 | 6/2002 | Van Diggelen | |
| 6,417,801 B1 | 7/2002 | Van Diggelen | |
| 6,429,814 B1 | 8/2002 | Van Diggelen et al. | |
| 6,453,237 B1 | 9/2002 | Fuchs et al. | |
| 6,484,097 B2 | 11/2002 | Fuchs et al. | |
| 6,487,499 B1 | 11/2002 | Fuchs et al. | |
| 6,510,387 B2 | 1/2003 | Fuchs et al. | |
| 6,542,820 B2 | 4/2003 | LaMance et al. | |
| 6,560,534 B2 | 5/2003 | Abraham et al. | |
| 6,606,346 B2 | 8/2003 | Abraham et al. | |
| 6,704,651 B2 | 3/2004 | Van Diggelen | |
| 6,708,146 B1 * | 3/2004 | Sewall et al. ................. | 704/217 |
| 2005/0135290 A1 * | 6/2005 | Kluge et al. ................. | 370/315 |
| 2006/0050801 A1 * | 3/2006 | Beach et al. ................. | 375/260 |
| 2007/0201588 A1 * | 8/2007 | Loiseau et al. .............. | 375/346 |

* cited by examiner

*Primary Examiner*—David C Payne
*Assistant Examiner*—Brian J Stevens
(74) *Attorney, Agent, or Firm*—Thomas, Kayden, Horstemeyer & Risley, LLP (57) ABSTRACT

Methods and Systems for tracking symbol timing of an OFDM signal are disclosed. In one embodiment, a wireless receiver includes signal tracking and timing logic to facilitate the timing of a demodulation operation such that the demodulation operation occurs on the proper symbol boundary, particularly when the OFDM signal has multipath components and the second component has greater power than the first.

16 Claims, 10 Drawing Sheets

FIGURE 1 (Prior Art)
(TIMING RELATIONSHIP BETWEEN OFDM DATA SYMBOL AND FFT TIMING)

APPARATUS AND METHOD FOR TRACKING SYMBOL TIMING OF OFDM MODULATION IN A MULTI-PATH CHANNEL

RELATED APPLICATIONS

This application claims the priority benefit of U.S. Provisional Patent Application 60/714,927, filed Sep. 7, 2005, and U.S. Provisional Patent Application 60/753,469, filed Dec. 22, 2005, which are both incorporated herein by reference.

FIELD OF THE INVENTION

This invention relates to demodulation of OFDM signals in a multipath channel. More particularly, this invention relates to an apparatus and method for tracking symbol timing of OFDM modulation in a multipath channel.

BACKGROUND OF THE INVENTION

Multicarrier modulation (MCM), especially OFDM, is used in a wide variety of wireless digital communication applications, including Digital Audio Broadcasting (DAB), wireless Local Area Networks (LAN), and Terrestrial Digital Video Broadcasting (DVBT). In an OFDM system, data is carried on narrowband sub-carriers in the frequency domain. The data is transformed into the time domain for transmission (e.g., using an inverse fast Fourier transform (IFFT)) and then transformed back to the frequency domain at the receiver (e.g., using an FFT). The popularity of OFDM is due in part to its robustness against multipath delay spread and narrowband interference, high data transmission rate capability, and spectral efficiency.

Coherent modulation using quadrature amplitude modulation (QAM) instead of differential modulation schemes such as differential phase shift keying (DPSK) is preferred for OFDM applications due to its improved signal-to-noise ratio (SNR) performance. QAM, however, requires channel estimation to determine best possible decision boundaries for the constellation of each sub-carrier. Hence, channel estimation is a crucial part of OFDM to achieve high data rate performance.

Figure 1:
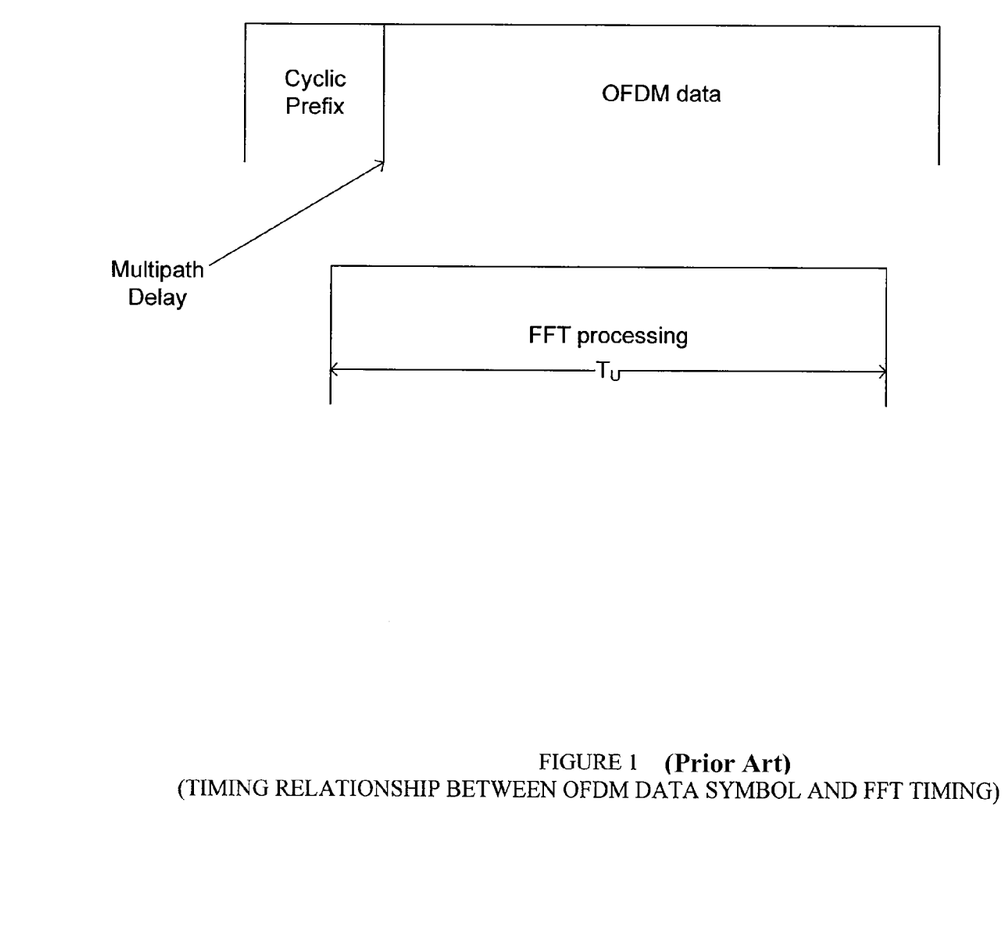
FIG. 1 illustrates the timing relationship between an OFDM data symbol and an FFT operation.

Techniques for tracking symbol timing can be categorized as pre-FFT and post-FFT. One example of a post-FFT technique derives tracking information from the relative phases of the demodulated known pilots, utilizing the fact that the received phase of a pilot equals the product of its carrier frequency and the multipath delay. Thus, the slope of the phase profile as a function of carrier frequency defines the delay. However, this approach does not resolve the individual multipath components so will tend to be dominated by the strongest component; also, the phase has to be "unwrapped" to allow for cycle ambiguity. An example of a pre-FFT technique exploits the repetitive waveform of the cyclic prefix by computing the autocorrelation, defined as the product of the received waveform sample and the complex conjugate of the waveform sample received earlier by $T_U$ (where $T_U$ is the FFT processing duration and the OFDM data duration as shown in FIG. 1). This autocorrelation has an average value of zero except when there is a match between the cyclic prefix and the waveform repetition at the end of the OFDM data. The problem solved by the present invention is to determine how to set the FFT timing in the receiver near the leading edge of the portion of the nonzero autocorrelation due to the earliest multipath component.

Many solutions for the multipath timing synchronization have been proposed. For example, N. Chen et al., propose "OFDM Timing Synchronization Under Multi-path Channels", IEEE 2003. The schemes described in this reference, however, require large amounts of averaging and, hence, long response times when operating at low SNRs. Another proposal by C. Williams et al, "Robust OFDM Timing Synchronization", Electronics Letters June 2005, fails to synchronize if the difference in relative power between the first path (which one wants to track) and the later paths is more than 6 dB, with the second path being stronger. Donghoon Lee and Kyungwhoon Cheun, "Coarse Symbol Synchronization Algorithms for OFDM Systems in Multipath Channels", IEEE Communication letters, October 2002 propose a method for coarse symbol acquisition but this scheme is not suitable for time tracking. Rohit Negi and John M Cioffi, "Blind OFDM Symbol Synchronization in ISI channels", September 2002, IEEE Transactions on Communications present a computationally demanding method for channel estimation, requiring multiple singular value decompositions per symbol. As such it cannot be implemented with low complexity in an application specific integrated circuit (ASIC). Finally, the process proposed by Karthik Ramasubramanian and Kevin Baum, "An OFDM Timing Recovery Scheme with Inherent Delay-Spread Estimation", *IEEE GLOBECOM '01*, vol 5, pp. 3111-3115 (2001) has a similar problem to that proposed by Williams et al., in that it cannot distinguish paths with low powers relative to larger secondary paths.

BRIEF DESCRIPTION OF THE DRAWINGS

The present invention is illustrated by way of example, and not limitation, in the figures of the accompanying drawings, in which.

DETAILED DESCRIPTION

Described herein are techniques for estimating OFDM symbol timing paths in multipath channels. In the description below, reference is made to various algorithms. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared or otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic device (analog, digital or a combination), that manipulates and transforms data represented as physical (electronic) quantities within the computer system's registers and memories into other data similarly represented as physical quantities within the computer system's registers and memories or other such information storage or display.

A. Overview of a First Embodiment

Some OFDM modulations, such as IEEE 802.11a and IEEE 802.16d, intermittently transmit a synchronization preamble to establish the demodulator timing. In a first embodiment, a tracking technique described herein is intended for OFDM that transmits data continually without inserting synchronization preambles under a condition of a large delay spread approaching the full duration of the cyclic prefix. An example is Digital Video Broadcasting (DVB) for digital terrestrial television applied to data transmission in a single-frequency network with multipath a consequence of transmitting identical signals from multiple transmitters. It is the objective of the present invention to maximize the tolerable delay spread of the multipath components by setting the timing in the receiver such that the earliest multipath component is received positioned as early as possible within the guard interval determined by the cyclic prefix. This should be possible even in the presence of stronger delayed multipath components. FIG. 1 illustrates the desired timing relationship that maintains carrier orthogonality of a multipath component, provided that the multipath delay, which is the time shift of the OFDM data with respect to the FFT processing interval $T_U$ in the receiver, does not exceed the guard interval.

B. Creation of Restoring Force at the Desired Tracking Point

According to the first embodiment of the invention, the new technique creates a restoring force from an autocorrelation operation that has a tracking point at the desired time position. Mathematically, the restoring force derived from the autocorrelation operation is:

$$\text{Restoring Force} = \text{Re} \frac{\frac{1}{Ksmooth} \sum_{k=1}^{Ksmooth} s(t_k + \tau) s*(t_k + \tau - T_U)}{\frac{1}{Ksymb} \sum_{k=1}^{Ksymb} |s(t_k)|^2} - \gamma \quad (1)$$

where the autocorrelation result is smoothed over a specified number of samples Ksmooth. The autocorrelation is normalized by dividing by the power of the received signal averaged over the number of samples Ksymb in the total symbol duration including the cyclic prefix. The restoring force is created by subtracting the fixed design constant $\gamma$.

Figure 2:
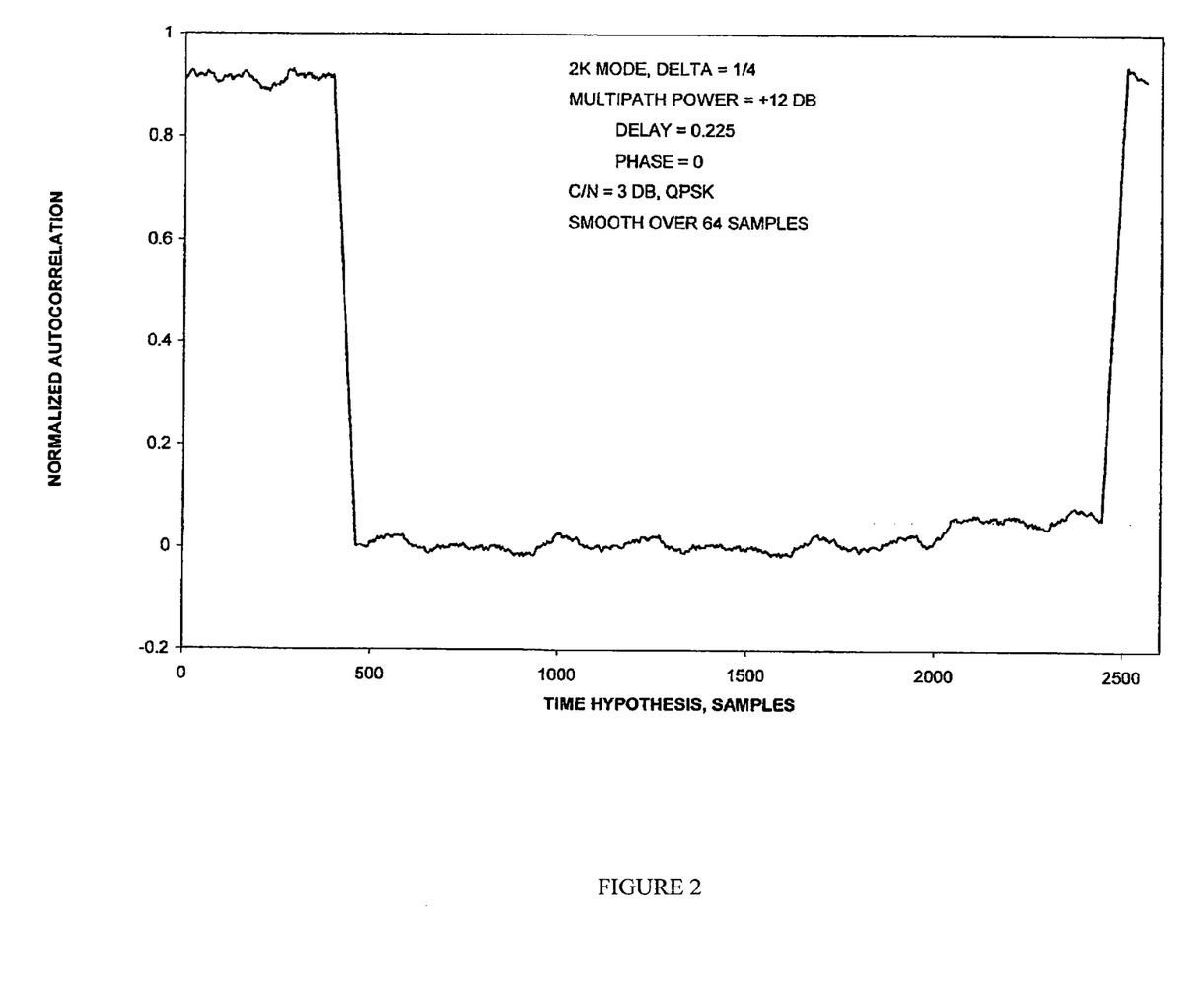
FIG. 2 illustrates a timing diagram for an autocorrelation operation of an OFDM signal with multipath components.

FIG. 2 is an example of Equation 1, plotted with $\gamma=0$, for a mode of DVB in a single frequency network with two paths, where the late path is much stronger than the early path. The desired tracking point is at sample number slightly past 2000 on the abscissa, which is the time location of the leading edge of the autocorrelation due to the weak early path. The later large rise of the normalized autocorrelation is the time location of the autocorrelation due to the strong late path.

By properly setting $\gamma$, the tracking point will be driven to the desired leading edge due to the weak early path even in the presence of the strong late path. From FIG. 2, $\gamma \approx 0.02$ appears to be a suitable fixed design value for a large power ratio between the weak early path and the strong late path. However, if the late path is too strong, the tracking point will displace to the late tracking position. Thus, there is a maximum power ratio that can be accommodated.

An alternative normalization is to divide by the instantaneous power, according to:

$$\text{Restoring Force}(\tau) = \text{Re} \frac{1}{Ksmooth} \sum_{k=1}^{Ksmooth} \frac{s(t_k + \tau) s*(t_k + \tau - T_U)}{|s(t_k + \tau) s*(t_k + \tau - T_U)|} - \gamma \quad (2)$$

This has similar behavior to Equation 1.

C. Simulation of Symbol Time Tracking

Figure 3:
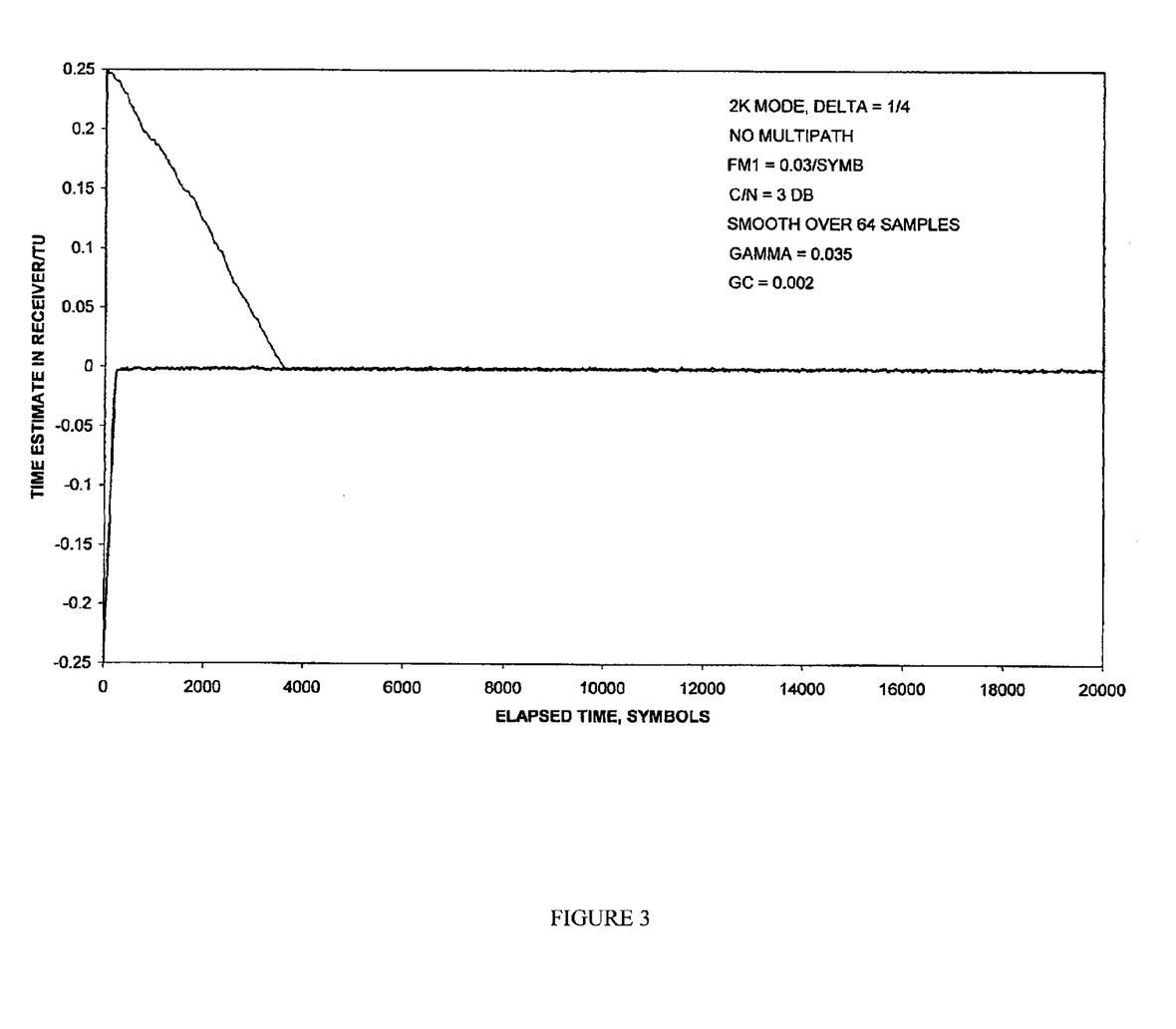
FIG. 3 illustrates the pull-in effect of a timing signal for pre-FFT symbol tracking with a non-fading channel, according to one embodiment of the invention.
Figure 4:
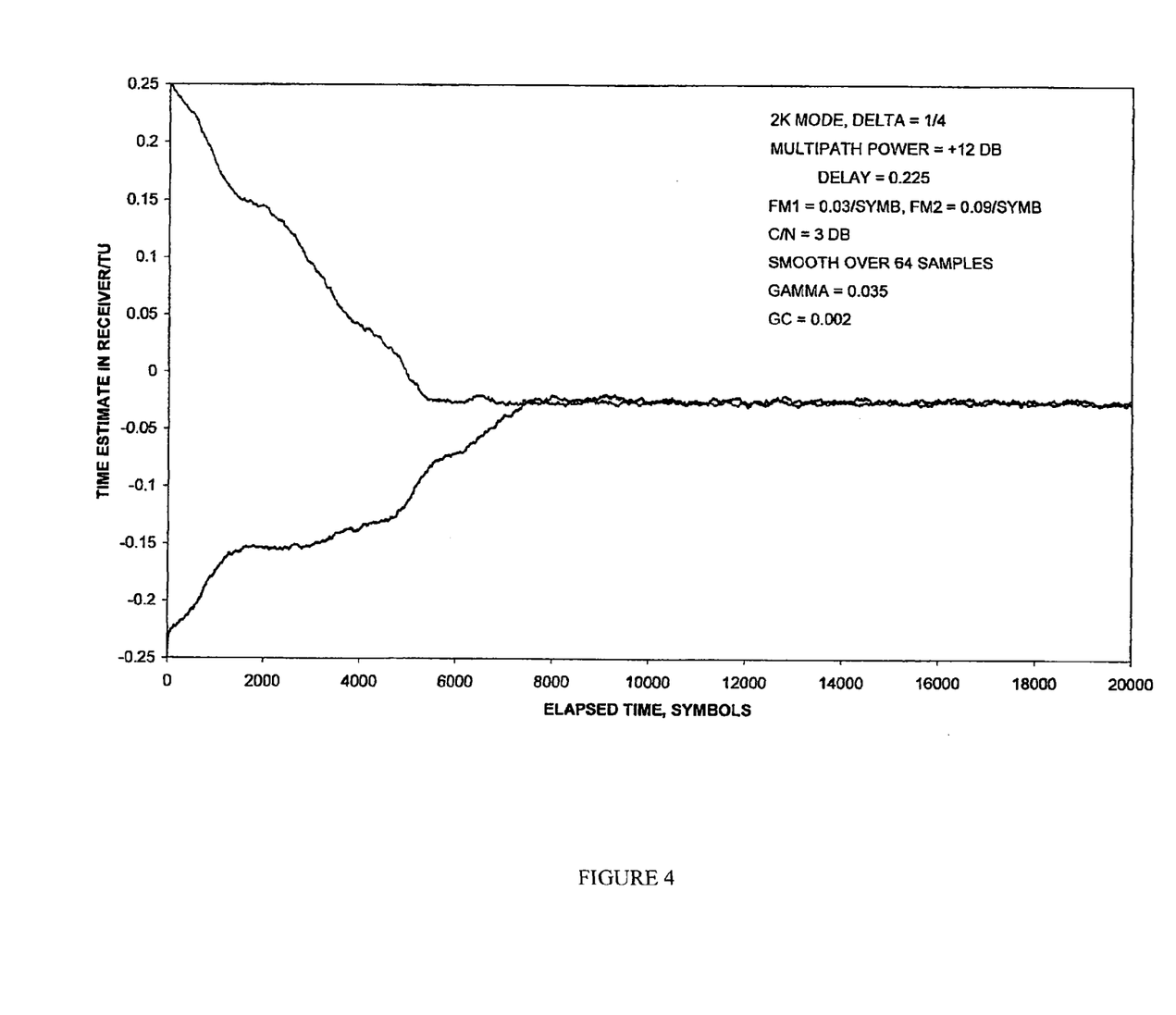
FIG. 4 illustrates the pull-in effect of a timing signal for pre-FFT symbol tracking with a two-path non-fading channel, according to one embodiment of the invention.

The objective is for the symbol time tracking to be able to pull to the correct tracking point from an initial positive or negative time error. FIG. 3 illustrates the desired behavior for a single path, and FIG. 4 for the two-path channel with a strong late path. Assuming a somewhat smaller value of $\gamma$, Table 1 (below) gives some simulation results for the tracking point in a two-path channel for several different conditions of received signal power to noise power (C/N) and the power of the late path relative to the early path. Note in Table 1 that the symbol tracking time maintains itself correctly at the timing of the early weak path until the strong late path exceeds roughly +15 dB relative to the weak path. This behavior is achieved even when C/N of the weak early path is quite low, such that the early path is not usable by itself for data demodulation.

The important consideration in these simulation results is that $\gamma$ is a fixed design constant not dependent on the actual multipath condition of the channel. Of course, $\gamma$ will be dependent on the known OFDM waveform parameters.

TABLE 1

Tracking Limits for 2K mode, $\Delta = \frac{1}{4}$, Ksmooth = 64, $\gamma = 0.02$.

| SFN delay spread | Doppler | Power of late path | C/N of early path | Symbol tracking time |
|---|---|---|---|---|
| 0.225 $T_U$ | 0.1 cycle/symbol | +12 dB | −9 dB | −0.018 $T_U$ |
| 0.225 $T_U$ | 0.1 | +15 | −6 | −0.028 $T_U$ |
| 0.225 $T_U$ | 0.1 | +20 | −6 | −0.189 $T_U$ |

D. Block Diagram of Tracking Technique

Figure 5:
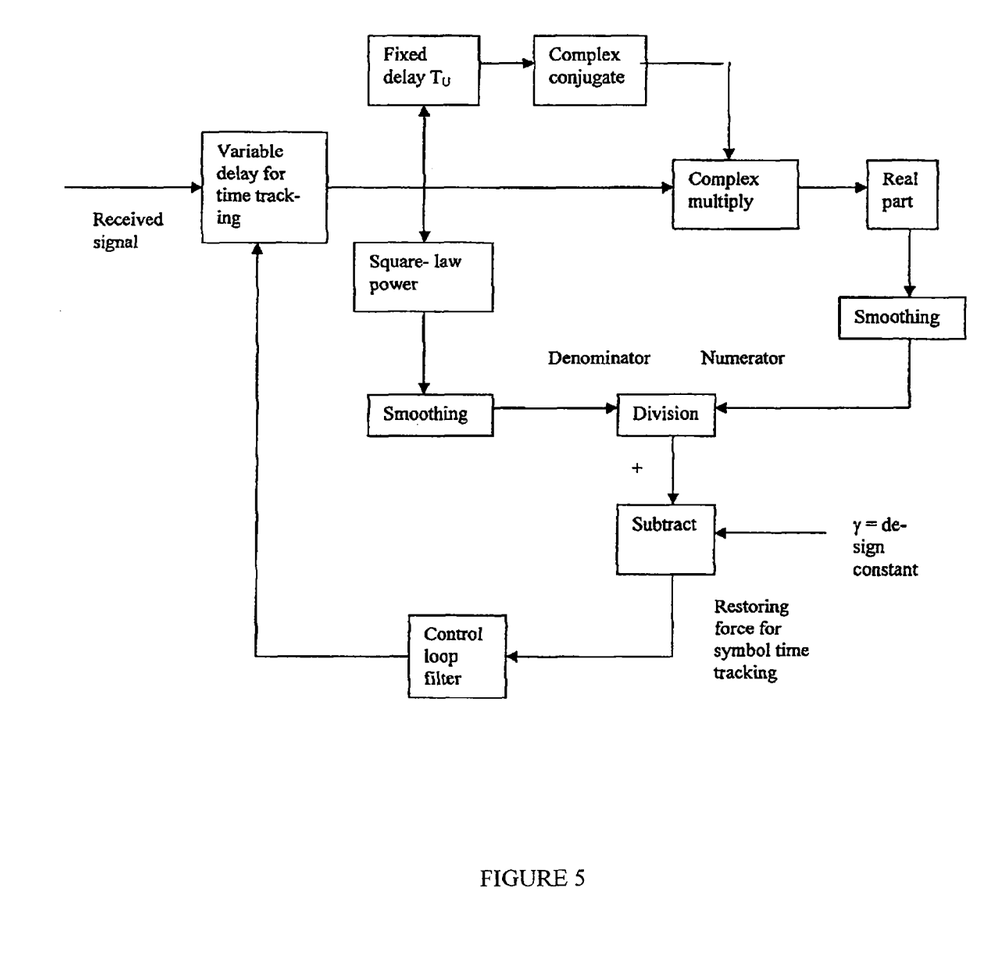
FIG. 5 illustrates a functional block diagram of logic components for symbol time tracking, according to one embodiment of the invention.

FIG. 5 is a functional block diagram of the tracking technique, which accepts samples of the received signal. One method of implementing the variable delay under the control of the restoring force is by varying the size of buffer storage to delay the received samples. Another method is to drop or repeat received samples under control of the restoring force.

E. Overview of a Second Embodiment

Most OFDM systems, including those compliant with the DVB standard, have "null carriers" present. "Null carriers"

are those carriers where there is no transmitted signal. With perfect time estimation the signal power in the "null carriers" is not contaminated by inter-symbol interference (ISI). Hence, with good symbol time estimation the signal power in the "null carriers" is proportional only to thermal noise (or, stated differently, in a receiver with perfect symbol timing, the signal received in null carriers can be attributed to thermal noise). A timing offset, however, introduces ISI, hence the signal power in the "null carriers" increases (being now due to ISI and thermal noise). Monitoring the signal power in the "null carriers" therefore is an efficient mechanism for obtaining the starting time estimate.

Figure 7:
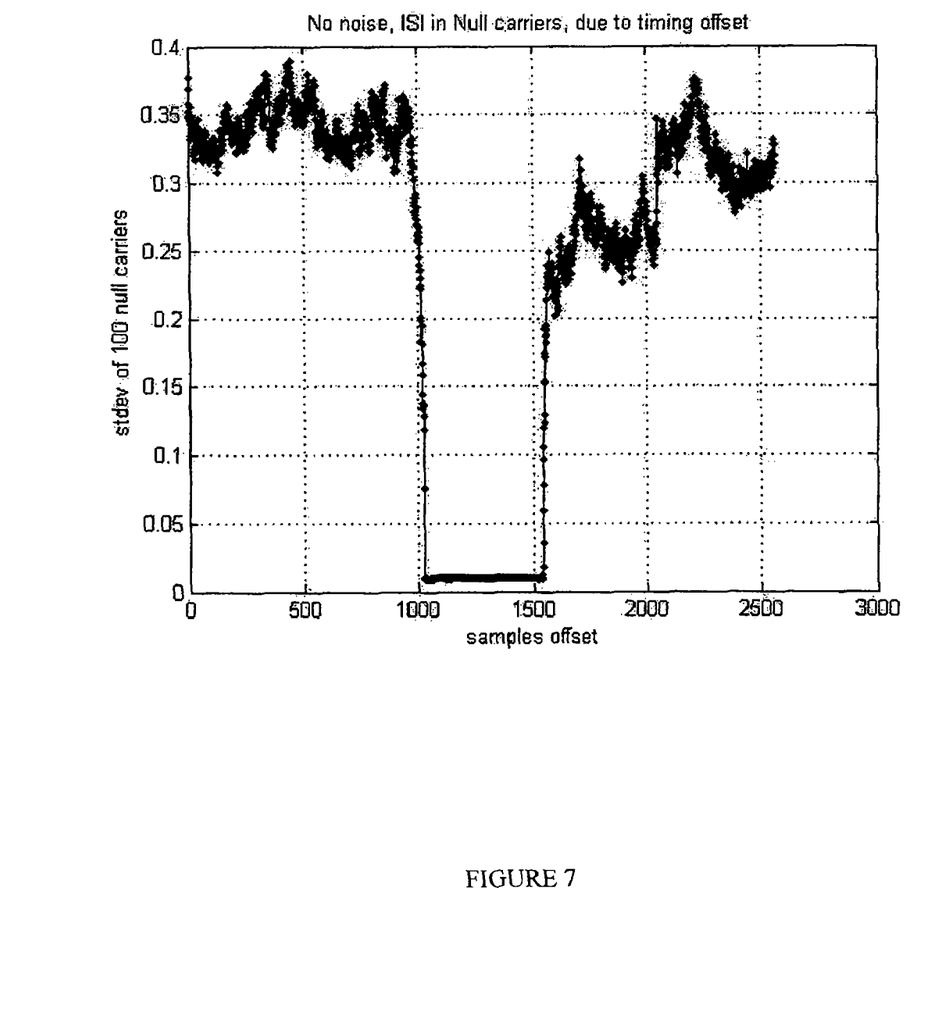
FIG. 7 is a graphical illustration of signal power in null carriers due to ISI. The flat portion represents the guard region, wherein the ISI is minimal. Samples outside the ISI free region give rise to ISI in the null carriers.

It is well known that for OFDM systems with a cyclic prefix, there may be more than one valid sampling window for obtaining an ISI-free version of the data portion of the OFDM symbol. This occurs when a portion of the cyclic extension is corrupted by ISI while the rest remains ISI-free. For example, see FIG. 1 in Karthik Ramasubramanian, Kevin Baum, "An OFDM Timing Recovery Scheme with Inherent Delay-Spread Estimation", *IEEE GLOBECOM* '01, vol 5, pp. 3111-3115 (2001), or FIG. 1 in A. I. Bo et al., "Symbol Synchronization Technique in COFDM Systems", IEEE Transactions on Broadcasting, March 2004, each of which is incorporated herein by reference. An example of the ISI free region is shown in FIG. 7.

Figure 6:
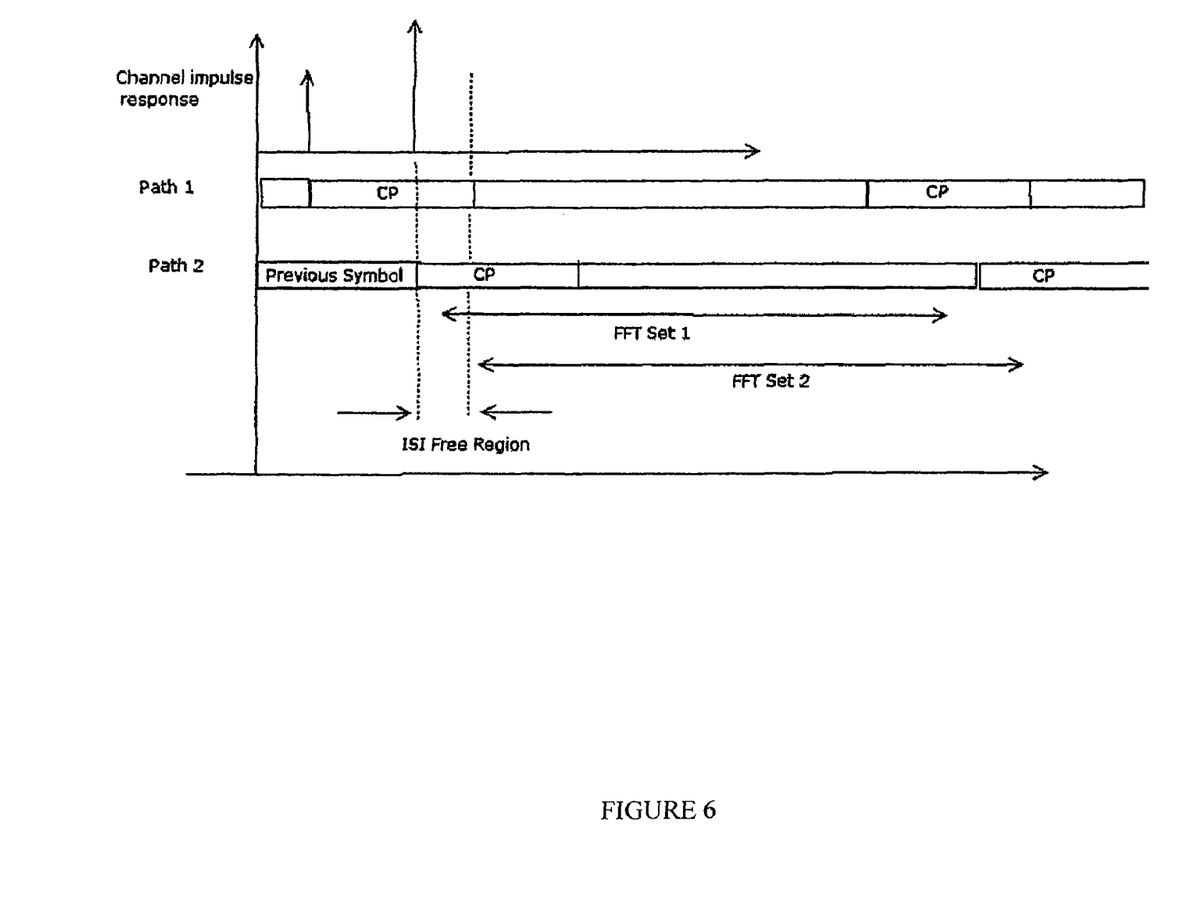
FIG. 6 illustrates an ISI-free region of an OFDM signal having multipath components.
Figure 8:
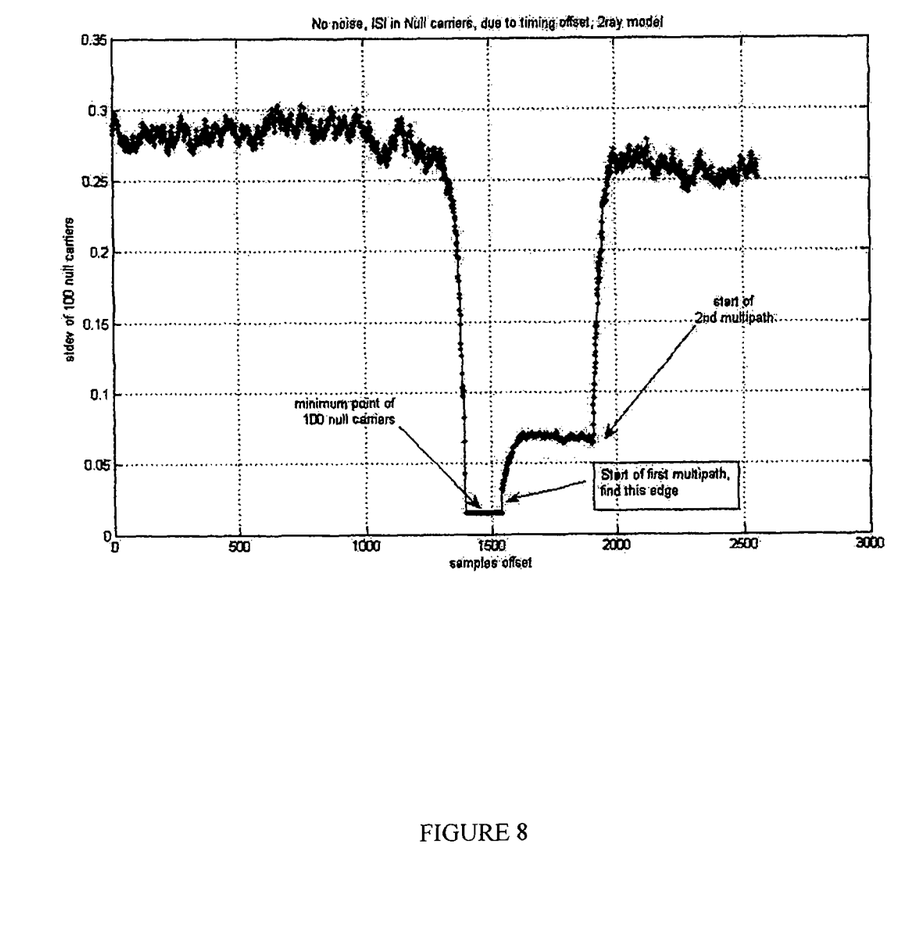
FIG. 8 illustrates the effect of ISI with a two ray channel model.

If an FFT is taken with sample set 1 (FFT Set 1 in FIG. 6) starting from the ISI free region, the "null carriers" will contain only the effects of thermal noise. If an FFT is taken from sample set 2 (FFT Set 2 in FIG. 6), then the "null carrier" locations will contain the effects of ISI. The further the starting time is from the ISI free region, the larger is the ISI in the "null carriers". An example of the signal power in the ISI free region and ISI region for a simple AWGN channel is shown in FIG. 8.

In accordance with an embodiment of the present invention then, the energy in the "null carriers" is monitored. The first FFT set outside the ISI free region will experience a jump in energy in the "null sub-carriers". This represents the start of the next symbol, and hence is a symbol timing point. An edge detection process is used to identify this start.

F. The Sliding DFT

The challenge posed by this procedure is in monitoring the energy in the "null carriers" for every sample. If this is implemented by performing a new FFT for every new input sample, then power consumption may be too great for some applications. Fortunately, the sliding DFT (see, Eric Jacobsen and Richard Lyons, "The Sliding DFT", IEEE Signal Processing Magazine, 2003) provides a cost effective mechanism which can provide an FFT output for every sample input.

An exemplary embodiment of the above-described procedure may thus be as follows:

(1) Perform a sliding DFT on 50 "null carriers" on either side of the desired signal. The number 50 can optionally be adapted as required based on SNR delay spread estimation. In this implementation, the number 50 on either side of the desired signal is used.

(2) Monitor the average sample-by-sample signal strength, where the average is over the 100 (50 on either side) "null carriers", for every input sample. Hence, every input sample requires estimating the average signal strength over 100 outputs from the sliding DFT module. To save power, this monitoring may be done over the sample space of interest. That is, since this timing algorithm estimation range is limited to the maximum guard time, the monitoring of signal strength may be limited to current sample time±guard time number of samples. Note however that step (1) needs to be performed for every sample even though one can choose to monitor the signal strength for only a subset of such samples.

(3) Find a negative edge in the output (from step (2)). Alternatively, a minimum value from the entire set can be found.

(4) The first positive edge after the negative edge represents the required timing point.

Figure 9:
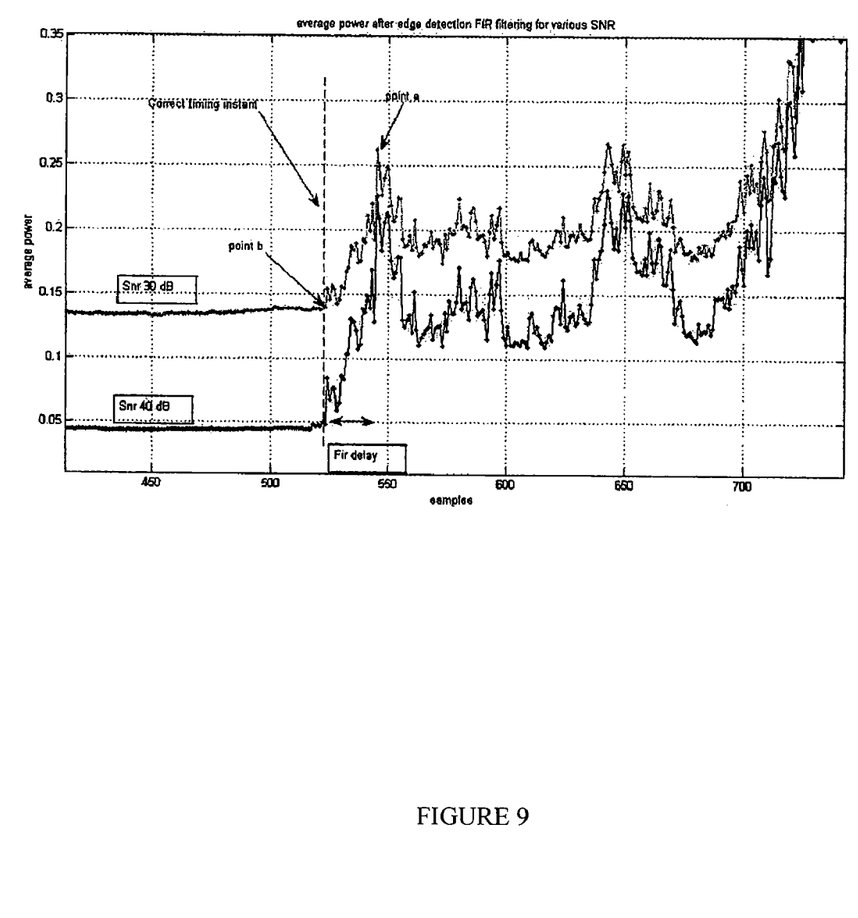
FIG. 9 illustrates average power at output of an edge detection process performed in accordance with an embodiment of the present invention for various signal-to-noise ratios.

(5) Edge detection is performed by first FIR smoothing the output by a ramp edge filter (e.g., as described in Maria Petrou and Josef Kittler, "Optimal Edge Detectors for Ramp Edges", IEEE Transactions on Pattern Analysis and Machine Intelligence, Vol 13, No 5, May 1991, incorporated herein by reference), followed by a simple three tap differentiator. This can be implemented by a combined single FIR filter. MATLAB code for generating this FIR filter is attached in Appendix A, incorporated herein by reference. The output at this stage is shown in FIG. 9.

(6) A positive edge is determined from the output power from step (2) as follows:

(i) Declare positive edge point if (signal power/signal power delayed by FIR delay)>function(SNR).

(ii) That is, calculate the ratio a/b (FIG. 9) at every sample. A table similar to Table 2 can be used for determining an edge point. The values in this table depend upon the number of "null carriers" used in processing. Table 2 represents numbers for 50 "null carriers" on either side of the desired signal.

Figure 10:
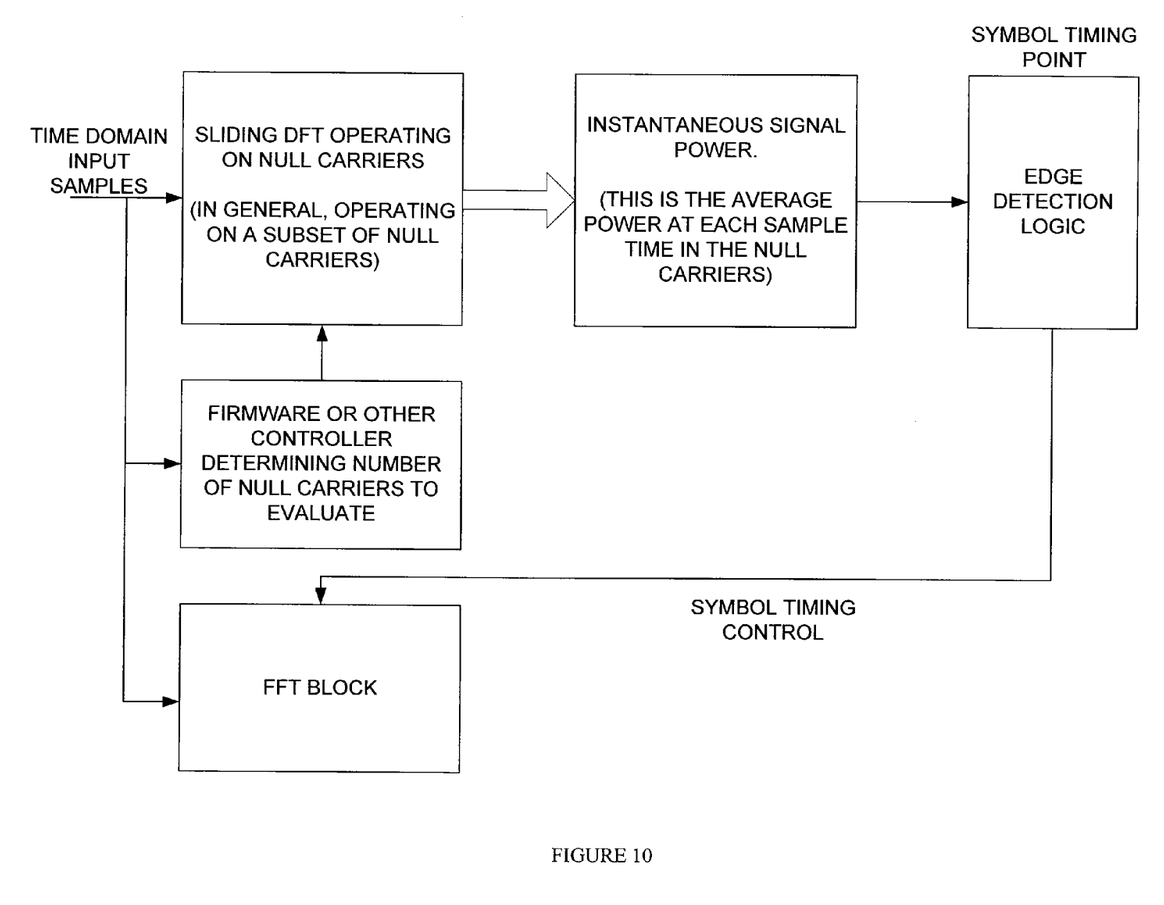
FIG. 10 illustrates an overview of a time estimation block for an OFDM receiver according to a second embodiment of the present invention.

FIG. 10 provides a functional block diagram of the logical components described in the method above. Thus, techniques for estimating OFDM symbol timing paths in multipath channels have been described. Of course the embodiments of the present invention discussed above are merely examples thereof and the reader should remember that other embodiments of the present invention are also encompassed by this disclosure. For example, in further embodiments of the present invention, processing of the output of the sliding DFT may be performed using a neural network for edge detection instead of power measurement and edge detection. Further, other forms of edge detection/pattern recognition techniques may be used.

Among the advantages offered by the present invention: It is scalable, in that more computation can be used to resolve harder problems and less computation can be used for easier problems. Further, it can resolve two paths with differential powers around 9 dB at low SNR without the excessive time delay filtering required by the solution proposed by Chen et al.

TABLE 2

| SNR | Threshold for ratio a/b |
|---|---|
| 40 dB | 4 |
| 30 dB | 1.667 |
| 20 dB | 1.136 |
| 10 dB | 1.02 |

APPENDIX A

%MATLAB function to create edge filter for ramp edge
%detection
clear h;
clear final_filter;
L1 = −3.720437;
L2 = 0.1399123;
L3 = −0.05068549;

APPENDIX A-continued

```
L4 = -0.1382914;
L5 = 0.8720965;
L6 = 0.56;
L7 = 3.465760;
A = 0.41;
s = 1/4;
w = 7;
%account for different s
w = w/s;
L1 = L1/s;L2 = L2/s;L3 = L3/s;L4 = L4/s;L6 = L6/s;L7 = L7/s;
A = A*s;
for x = -w:0
    h(x+w+1) = exp(A*x)*(L1*sin(A*x) + L2*cos(A*x)) + exp(-A*x) * (L3*sin(A*x)+L4*cos(A*x)) + L5*x + L6*exp(s*x) + L7;
end;
%h = [h; fliplr(h)];
h = [h fliplr(h)];
diff = [1 0 -1];
final_filter = filter(diff,1,h);plot(final_filter)
```

What is claimed is:

1. A wireless signal receiver to demodulate an OFDM signal having multipath components, said receiver comprising symbol timing logic to control the timing of a Fourier Transformation operation by Fast Fourier Transform (FFT) logic, wherein the symbol timing logic is to drive the Fast Fourier Transform logic to perform the Fourier Transformation operation on signal data synchronized to a first multipath component received earlier in time than a second multipath component, wherein the symbol timing logic adjusts a result of an autocorrelation operation by a fixed design constant to generate a signal used to drive the timing of the FFT logic, wherein the autocorrelation operation determines an amount of correlation between a cyclic prefix and a later portion of the OFDM signal that repeats the cyclic prefix, wherein the fixed design constant is predetermined based at least in part on a plurality of OFDM waveform parameters, the fixed design constant being independent of the multipath components.

2. The wireless signal receiver of claim 1, wherein the result of the autocorrelation operation is smoothed over a specified number of samples of the OFDM signal.

3. The wireless signal receiver of claim 1, wherein the autocorrelation operation is normalized by dividing by the power of the signal averaged over the number of samples in the total symbol duration including the cyclic prefix.

4. The wireless signal receiver of claim 1, wherein the autocorrelation operation is normalized by dividing by the instantaneous power of the signal.

5. The wireless signal receiver of claim 1, wherein the first multipath component of the signal is received positioned as early as possible within a guard interval, thereby maximizing the tolerable time delay spread between the two multipath components.

6. The wireless signal receiver of claim 1, wherein a ratio of the second multipath component to the first multipath component is a predetermined maximum power ratio.

7. The wireless signal receiver of claim 1, wherein the symbol timing logic subtracts the fixed design constant from the result of the autocorrelation operation.

8. The wireless signal receiver of claim 1, wherein the fixed design constant is predetermined to drive a tracking point of the autocorrelation operation to a leading edge of the first multipath component for a maximum power ratio of the second multipath component to the first multipath component.

9. In a wireless signal receiver, a method of tracking symbol timing in a received signal having multipath components, comprising:
    setting FFT timing in the receiver near a leading edge of a portion of a nonzero autocorrelation operation due to a first multipath component by shifting a result of the autocorrelation operation based on a fixed design constant, the fixed design constant being predetermined based at least in part on a plurality of OFDM waveform parameters, the fixed design constant being independent of the multipath components of the received signal, the fixed design constant being predetermined to drive a tracking point of the autocorrelation operation to a leading edge of the first multipath component for a maximum power ratio of a second multipath component to the first multipath component.

10. The method of claim 9, wherein the autocorrelation operation determines an amount of correlation between a cyclic prefix and a later portion of the received signal that repeats the cyclic prefix.

11. The method of claim 9, wherein the autocorrelation operation is smoothed over a specified number of samples of the received signal.

12. The method of claim 9, wherein the autocorrelation operation is normalized by dividing by the power of the received signal averaged over the number of samples in the total symbol duration including the cyclic prefix.

13. The method of claim 9, wherein the autocorrelation operation is normalized by dividing by the instantaneous power of the received signal.

14. The method of claim 9, wherein the first multipath component of the signal is received positioned as early as possible within a guard interval, thereby maximizing the tolerable time delay spread between two or more multipath components.

15. The method of claim 9, wherein the maximum power ratio of the second multipath component to the first multipath component is predetermined.

16. The method of claim 9, wherein the shifting comprises subtracting.

* * * * *